US006957892B2

(12) United States Patent
Kuroda

(10) Patent No.: US 6,957,892 B2
(45) Date of Patent: Oct. 25, 2005

(54) LIGHTING SYSTEM, DISCHARGE UNIT, AND PROJECTOR INCLUDING THE SAME

(75) Inventor: Akitoshi Kuroda, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/687,823

(22) Filed: Oct. 20, 2003

(65) Prior Publication Data

US 2004/0189954 A1 Sep. 30, 2004

(30) Foreign Application Priority Data

Oct. 18, 2002 (JP) ........................................ 2002-304758
Oct. 18, 2002 (JP) ........................................ 2002-304843

(51) Int. Cl.[7] .......................... G03B 21/16; G03B 21/14
(52) U.S. Cl. ............................ 353/61; 353/52; 353/119
(58) Field of Search ............................... 353/52, 57, 58, 353/60, 61, 119

(56) References Cited

U.S. PATENT DOCUMENTS

| 3,610,747 | A | * | 10/1971 | Bickel ........................... 353/61 |
| 6,065,838 | A | * | 5/2000 | Konuma et al. ............... 353/61 |
| 6,497,489 | B1 | * | 12/2002 | Li et al. ........................ 353/61 |
| 6,641,267 | B2 | * | 11/2003 | Ohishi et al. .................. 353/61 |
| 6,746,125 | B2 | * | 6/2004 | Nakano et al. ................ 353/61 |
| 2002/0036755 | A1 | * | 3/2002 | Nakano ......................... 353/31 |
| 2003/0179579 | A1 | * | 9/2003 | Hsu et al. ..................... 362/294 |
| 2004/0125343 | A1 | * | 7/2004 | Hara et al. ..................... 353/57 |

FOREIGN PATENT DOCUMENTS

| JP | A 8-304739 | 11/1996 |
| JP | A 2000-10191 | 1/2000 |
| JP | A 2000-330202 | 11/2000 |

* cited by examiner

Primary Examiner—Judy Nguyen
Assistant Examiner—Andrew Sever
(74) Attorney, Agent, or Firm—Oliff & Berridge, PLC

(57) ABSTRACT

A projector includes a light-source device, a discharge duct having an air intake port facing the light-source device and a discharge port, an axial fan mounted between the air intake port and the light-source device in an outer casing. The discharge port has an opening area smaller than that of the air intake port and is eccentric to the air intake port. The direction of air flow from the axial fan is inclined with respect to the direction of the discharge of a cooling air from the discharge port. Accordingly, when the cooling air that has cooled a light source lamp is discharged through the discharge duct with the axial fan, the light blocking effect can be increased and the discharge pressure of the cooling air discharged can be increased.

20 Claims, 12 Drawing Sheets

LIGHTING SYSTEM, DISCHARGE UNIT, AND PROJECTOR INCLUDING THE SAME

TECHNICAL FIELD

The present invention relates to an electronic device and a projector including a light source, a cooling system for cooling the light source, a casing having a cooling-system intake port for taking in the air of the cooling system and a cooling-system discharge port for discharging the air of the cooling system and accommodating the light source, and a discharge unit for discharging the cooling air that cooled the light source from the cooling-system discharge port.

BACKGROUND ART

Projectors are well known that modulate light beams emitted from a light source in accordance with image information and project it on an enlarged scale. Such projectors are used for various applications: presentations with personal computers in companies, movie viewing at home, and so on.

Such projectors include an optical system for forming an optical image, a light source, a supply circuit for supplying them with power, a lamp drive circuit, and a casing for accommodating them.

The light source, the supply circuit, and the lamp drive circuit are heat sources that generate heat in operation, whereas optical components and optical modulators of the optical system include heat-sensitive ones. Therefore, the projectors are provided with a cooling system that takes in cooling air from the exterior of the casing to cool the components in the casing.

The cooling system is classified into an optical-system cooling system, a light-source cooling system, a power-supply and lamp-drive-circuit cooling system, and employs the following structure:

For example, the optical-system cooling system has a discharge fan near a discharge port of the casing and exhausts air that cooled an optical system with the discharge fan, as described in JP-A-2000-330202 (FIGS. 7 and 8) and JP-A-2000-10191 (FIG. 1). The light-source cooling system lets the air that has cooled the optical system into a light source and then discharges it with the discharge fan. The power-supply and lamp-drive-circuit cooling system lets the air that has cooled the optical system into a power supply and a lamp drive circuit to cool them and then exhausts it with the discharge fan.

DISCLOSURE OF THE INVENTION

The light-source cooling system is provided with a discharge duct that connects the light source to the discharge fan in order to guide the air that has cooled the light source to the discharge fan with high efficiency. The discharge duct is shaped as a substantially rectangular cylinder having a roughly fixed cross-sectional area, covering the light source at the intake port end and being connected to the discharge fan at the discharge port end. Therefore, the entire or almost light source can sometimes be seen from the exterior of the casing through the discharge duct, leading to low light-blocking effect.

Accordingly, it is an object of the present invention to provide a discharge unit capable of increasing light-blocking effect and a projector having the same.

An electronic device of the invention includes a light source; a discharge duct including an air intake port facing the light source and a discharge port for discharging cooling air that is taken from the air intake port and cooled the light source; and a discharge fan mounted between the air intake port and the light source in a casing. The discharge port has an opening area smaller than that of the air intake port and the discharge port is eccentric to the air intake port; and the direction of air flow from the discharge fan is inclined with respect to the direction of the discharge of the cooling air from the discharge port.

Preferably, the invention has an eccentric-side wall on the side where the discharge port is eccentric to the air intake port; the eccentric-side wall is substantially horizontal; and the discharge surface of the discharge fan is inclined away from the eccentric-side wall with distance from the air intake port toward the discharge port.

According to the invention, since the opening area of the discharge port is made smaller than that of the air intake port, the part of the light source lamp which can be viewed from the direction of discharge of the cooling air, or from the exterior of the discharge duct, can be decreased, thus improving light blocking effect and increasing the discharge pressure of the cooling air. Moreover, since the discharge port is arranged eccentrically to the air intake port, the center of the light source having high luminance can be avoided even if light leaks to the exterior.

Since the opening area of the discharge port is made smaller than that of the air intake port, the discharge fan must be miniaturized when the discharge fan is mounted to the discharge port end, and so the discharge performance is decreased. However, according to the invention, since the discharge fan is arranged at the air intake port end, sufficient discharge performance is ensured.

The part of the wall of the discharge duct opposite to the eccentric end of the discharge port is inclined with respect to the direction of the discharge of the cooling air. Therefore, when the direction of air flow from the discharge fan is substantially agreed with the cooling-air discharge direction, the cooling air passing by the eccentric side of the discharge port advances along the duct wall toward the discharge port, whereas the cooling air passing by the side opposite to the eccentric side strikes against the inclined duct wall, so that the air does not flow well.

According to the invention, since the flow of the cooling air passing by the eccentric side of the discharge port and another air flow passing by the opposite side can be well balanced by appropriately inclining the direction of air flow from the discharge fan relative to the discharge direction of the cooling air, the discharge efficiency can be improved.

Since the discharge surface of the discharge fan is inclined away from the eccentric-side wall of the discharge port, which is substantially horizontal, with distance from the air intake port toward the discharge port, the air flow in the discharge duct is well balanced, thus further increasing discharge efficiency.

In the invention, preferably, the discharge duct has an eccentric-side wall on the side where the discharge port is eccentric to the air intake port; the eccentric-side wall bulges toward the side where the discharge port is eccentric to the air intake port; and the discharge surface of the discharge fan is inclined away from the eccentric-side wall with distance from the air intake port toward the discharge port.

According to the invention, since the eccentric-side wall of the discharge duct bulges toward the eccentric side, the flow can be shifted gently toward the discharge port by decreasing the angle formed by the eccentric-side wall and the direction of air flow from the discharge surface of the discharge fan inclined away from the eccentric-side wall with distance from the air intake port toward the discharge port. Therefore frictional resistance by the eccentric-side wall of the discharge duct can be reduced and thus the cooling air can be discharged more smoothly.

In the invention, preferably, the discharge duct has an opposite eccentric-side wall on the side opposite to the side where the discharge port is eccentric to the air intake port; the opposite eccentric-side wall has a slope inclined closer to the eccentric-side wall with distance from the air intake port toward the discharge port; and the slope is provided to the duct intake end of the opposite eccentric-side wall.

According to the invention, since the slope inclined from the air intake port toward the discharge port can be arranged at the air intake port, the air flow taken into the discharge duct by the discharge fan can be rectified toward the discharge port by flowing along the slope, thereby increasing cooling efficiency.

Since the discharge surface of the discharge fan of the invention is inclined away from the eccentric-side wall with distance from the air intake port toward the discharge port, the air flow from the discharge fan is blown to the perpendicular of the slope of the discharge duct at an angle larger than that when the discharge surface of the discharge fan is arranged perpendicular to the eccentric-side wall of the discharge duct. Thus, the air flow taken from the discharge fan can be further rectified by the multiplication effect, increasing cooling efficiency.

In the invention, preferably, the opposite eccentric-side wall has a wall substantially parallel to the eccentric-side wall on the discharge port side.

According to the invention, since the discharge duct is cylindrical with substantially parallel walls in the vicinity of the discharge port, the air flow in the vicinity of the discharge port can be rectified substantially in the same direction, thus facilitating the setting of the discharge direction of the air from the discharge duct.

In the invention, preferably, the opening area of the discharge port is about half of that of the air intake port.

According to the invention, the light blocking efficiency by the discharge port can be maximized while ensuring the size of the discharge port sufficient to discharge the cooling air.

Preferably, the invention includes a louver having a plurality of blades and the louver is mounted to the discharge port.

According to the invention, providing the louver at the discharge port prevents the light leakage from the light source further and facilitates the control of the discharge direction of the air from the discharge duct with the louver.

The invention is characterized in that the electronic device is a projector comprising an optical system that modulates light beams emitted from the light source in accordance with image information to form an optical image and projects it on an enlarged scale.

The invention can achieve a projector capable of offering the advantages same as those of the above described electronic device, increasing light blocking effect and having increased cooling-air discharge pressure.

BEST MODE FOR CARRYING OUT THE INVENTION

Figure 1:
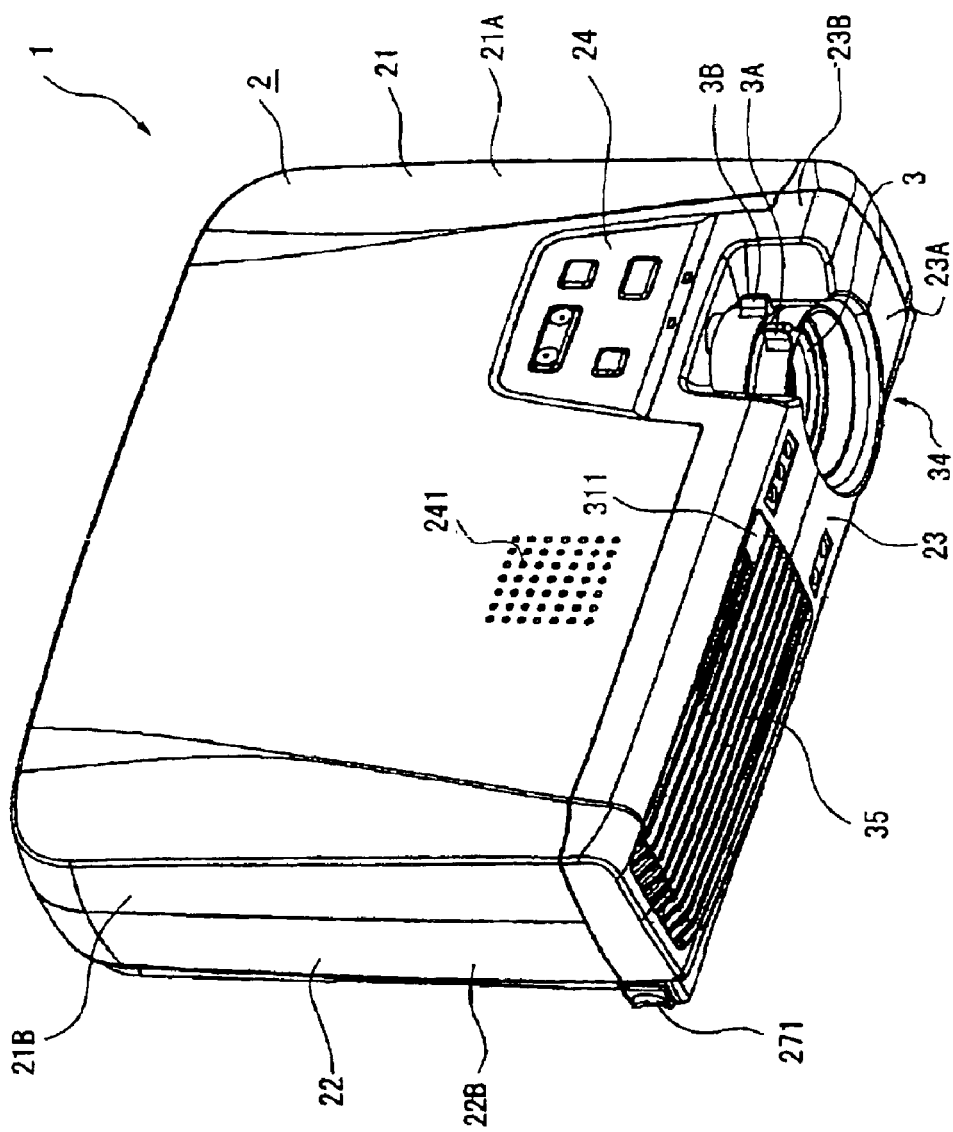
FIG. 1 is a schematic perspective view of the external structure of a projector according to an embodiment of the present invention.

Referring to the drawings, an embodiment of the present invention will be described hereinafter.

(1) External Structure

Figure 2:
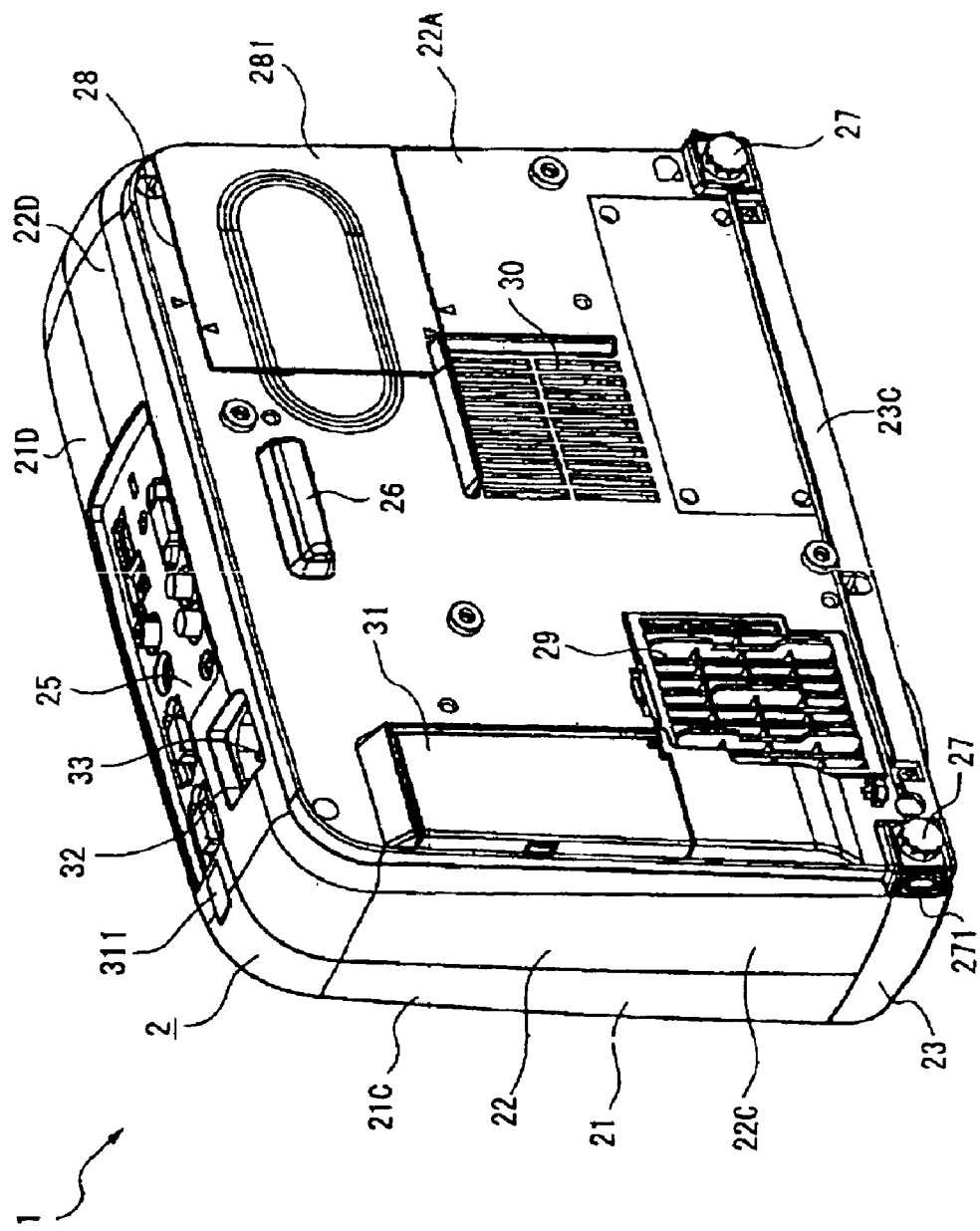
FIG. 2 is a schematic perspective view of the external structure of the projector according to the embodiment.

FIGS. 1 and 2 show a projector 1 according to an embodiment of the present invention. FIG. 1 is a perspective view seen from the upper front and FIG. 2 is a perspective view seen from the lower back.

The projector 1 is an optical device that modulates light beams emitted from a light source in accordance with image information and projects it on an enlarged scale onto a projection surface such as a screen and includes an outer casing 2 for accommodating a device body including a later-described optical system therein and a projector lens 3 exposed from the outer casing 2.

The projector lens 3 has the function as a projection optical system for projecting, under magnification, an optical image formed by modulating light beams emitted from a light source by an optical modulator in accordance with image information and combining the modulated light beams by light-combining means. The projector lens 3 is constructed as a combination lens including multiple lenses inside a lens barrel.

The outer casing 2 serving as a housing is shaped as a wide rectangular solid whose width perpendicular to the direction of projection is larger than the size along the projection, and has an upper case 21 for covering the upper part of the device body, a lower case 22 for covering the lower part of the device body, and a front case 23 for covering the front of the device body. The cases 21 to 23 are synthetic-resin integral moldings formed by such as injection molding.

The upper case 21 includes an upper surface 21A for covering the upper part of the device body, sides 21B and 21C which fall substantially from the lateral ends of the upper surface 21A, and a back 21D which falls substantially from the rear end of the upper surface 21A.

An operation panel 24 for activating and adjusting the projector 1 is provided on the front of the upper surface 21A in the direction of projection. The operation panel 24 has multiple switches including a run button and image-audio adjustment switches and is capable of adjusting picture quality and sound volume with the adjustment switches in the operation panel 24 at the time of projection by the projector 1.

There is a plurality of holes 241 in the upper surface 21A adjacent to the operation panel 24, in which an audio output speaker (not shown) is accommodated. The operation panel 24 and the speaker are electrically connected to a later-described control board that constructs the device body. Operation signals from the operation panel 24 are processed with the control board.

At the approximate center of the center of the back 21D, a recess cut away toward the upper surface 21A is formed, to which a connector group 25 is exposed. The recess is formed on an interface board connected to the later-described control board.

The lower case 22 is constructed to be nearly symmetrical about the engagement surface with the upper case 21, and has a bottom 22A, sides 22B and 22C, and a back 22D. The sides 22B and 22C and the back 22D are in engagement with the lower ends of the sides 21B and 21C and the back 21D of the upper case 21 at the upper ends in order to construct the side and the back of the outer casing 2.

The bottom 22A has a fixing foot 26 approximately in the center of the rear end of the projector 1 and adjustment foots 27, which are positioned at both front ends of the projector.

The adjustment foots 27 are each formed of a shaft-like member projecting retractably from the bottom 22A toward the exterior. The shaft-like members are accommodated in the outer casing 2. The retraction amount of the adjustment foots 27 from the bottom 22A can be adjusted with adjustment buttons 271 on the sides of the projector 1.

This allows the adjustment of the vertical position of a projection image emitted from the projector 1 to form the projection image in a proper position.

The bottom 22A also has openings 28, 29, and 30 communicating with the interior of the outer casing 2.

The opening 28, which is usually covered by a lamp cover 281, is for attachment and detachment of a light-source device 411 which includes the light source of the projector 1.

The openings 29 and 30 are each formed in the shape of a slit.

The opening 29 is an intake opening for taking in cooling air for cooling an optical device 44 including a liquid-crystal panel serving as an optical modulator for modulating light beams emitted from a light-source lamp in accordance with image information.

The opening 30 is an intake opening for taking in cooling air for cooling the power supply device which constructs the device body of the projector 1.

Since the openings 29 and 30 always communicate with the interior of the projector 1 through the respective slit-like openings, they are each provided with an antidust filter therein to keep dust out.

The bottom 22A is also provided with a lid 31 which is slidably attached to the outer side thereof, in which a remote controller is housed for operating the projector 1 by remote control. The remote controller (not shown) has a run button and adjustment switches similar to those of the operation panel 24; when the remote controller is operated, an infrared signal according to the operation is outputted from the remote controller and is processed by the control board through optical receivers 311 on the front and the back of the external casing.

The back 22D has a recess cut away toward the bottom 22A in nearly center, as in the upper case 21, from which the connector group 25 formed on the interface board is exposed and also has an opening 32 near the end, from which an inlet connector 33 is exposed. The inlet connector 33 is a terminal for supplying electricity from an external power to the projector 1 and is electrically connected to a later-described power unit.

The front case 23 is constructed of a front surface 23A, an upper surface 23B, and a lower surface 23C and is in engagement with the projection end of the upper case 21 at the projection rear end of the upper surface 23B and with the projection end of the lower case 22 at the projection rear end of the lower surface 23C.

The front surface 23A has a substantially circular opening 34 for exposing the projector lens 3 and an opening 35 having multiple slits adjacent thereto.

The opening 34 is further opened at the top, from which part of the lens barrel of the projector lens 3 is exposed so that tubs 3A and 3B provided around the lens barrel for zoom-focus adjustment can be handled from the exterior.

The opening 35 is constructed as a discharge opening for discharging air that has cooled the device body; the air that has cooled the components of the projector 1 such as an optical system, a control system, and a power supply device, which will be described later, is discharged through the opening 35 in the direction of the projection of the projector 1. In other words, the opening 35 is a discharge opening for discharging cooling-system cooling air for cooling the components of the projector 1.

(2) Internal Structure

Figure 3:
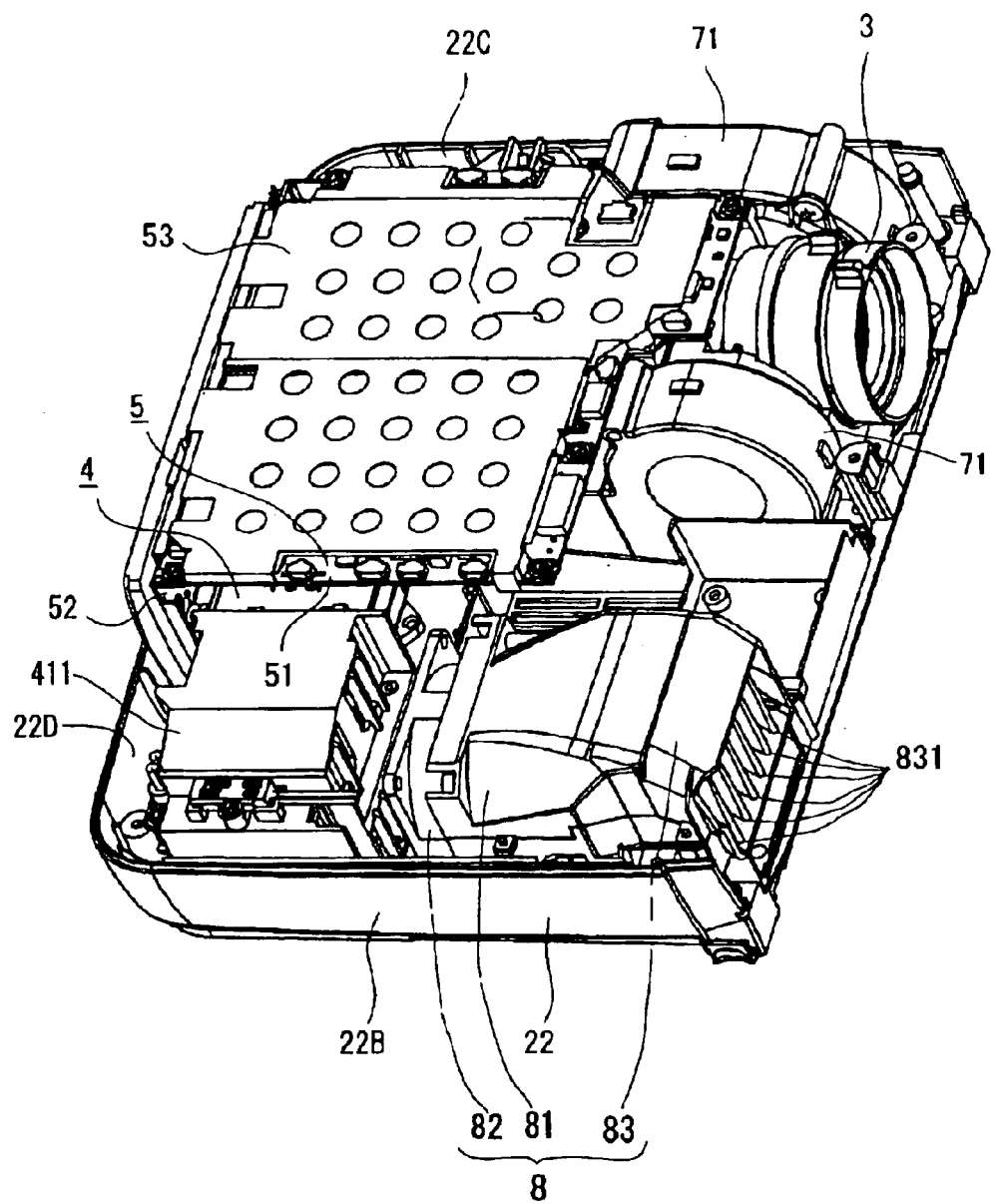
FIG. 3 is a schematic perspective view of the internal structure of the projector according to the embodiment.
Figure 4:
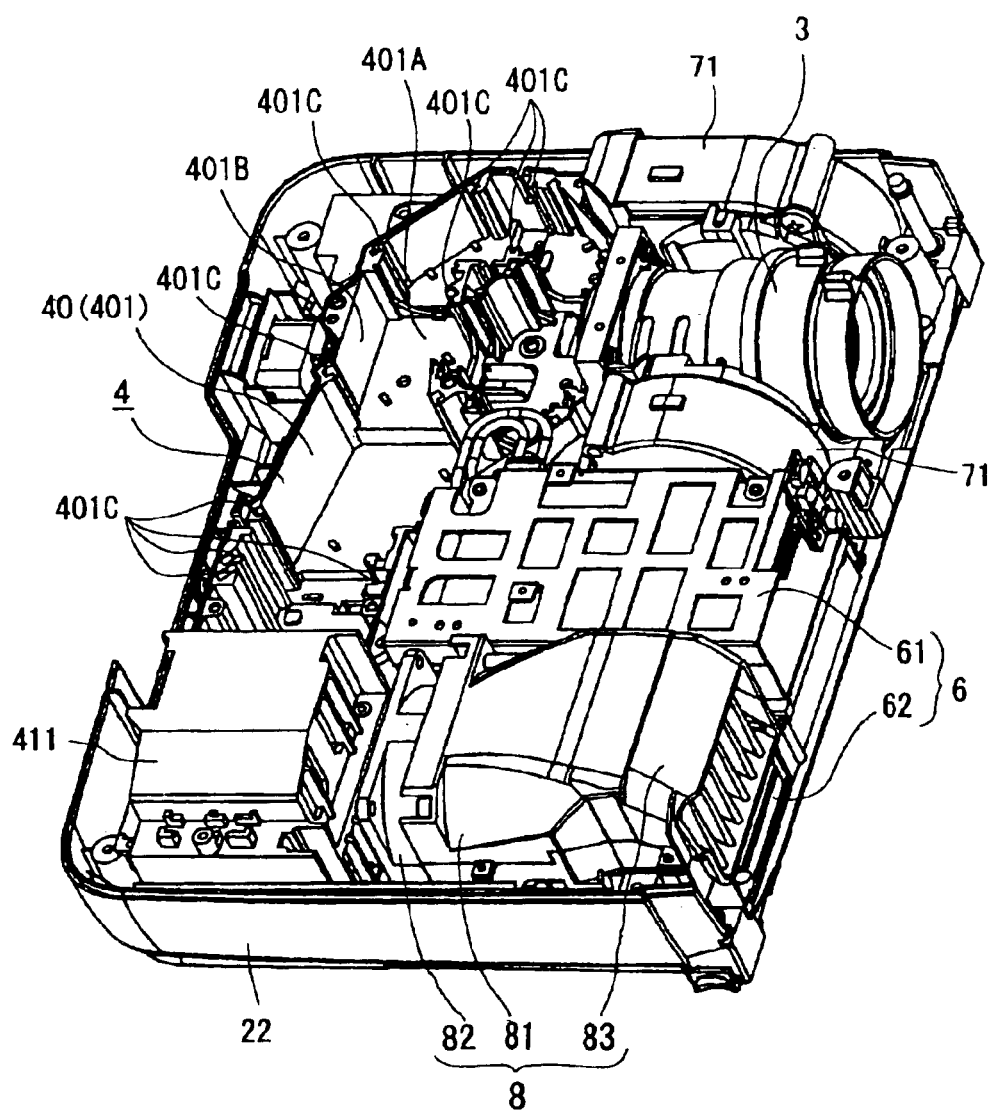
FIG. 4 is a schematic perspective view of the internal structure of the projector according to the embodiment.
Figure 5:
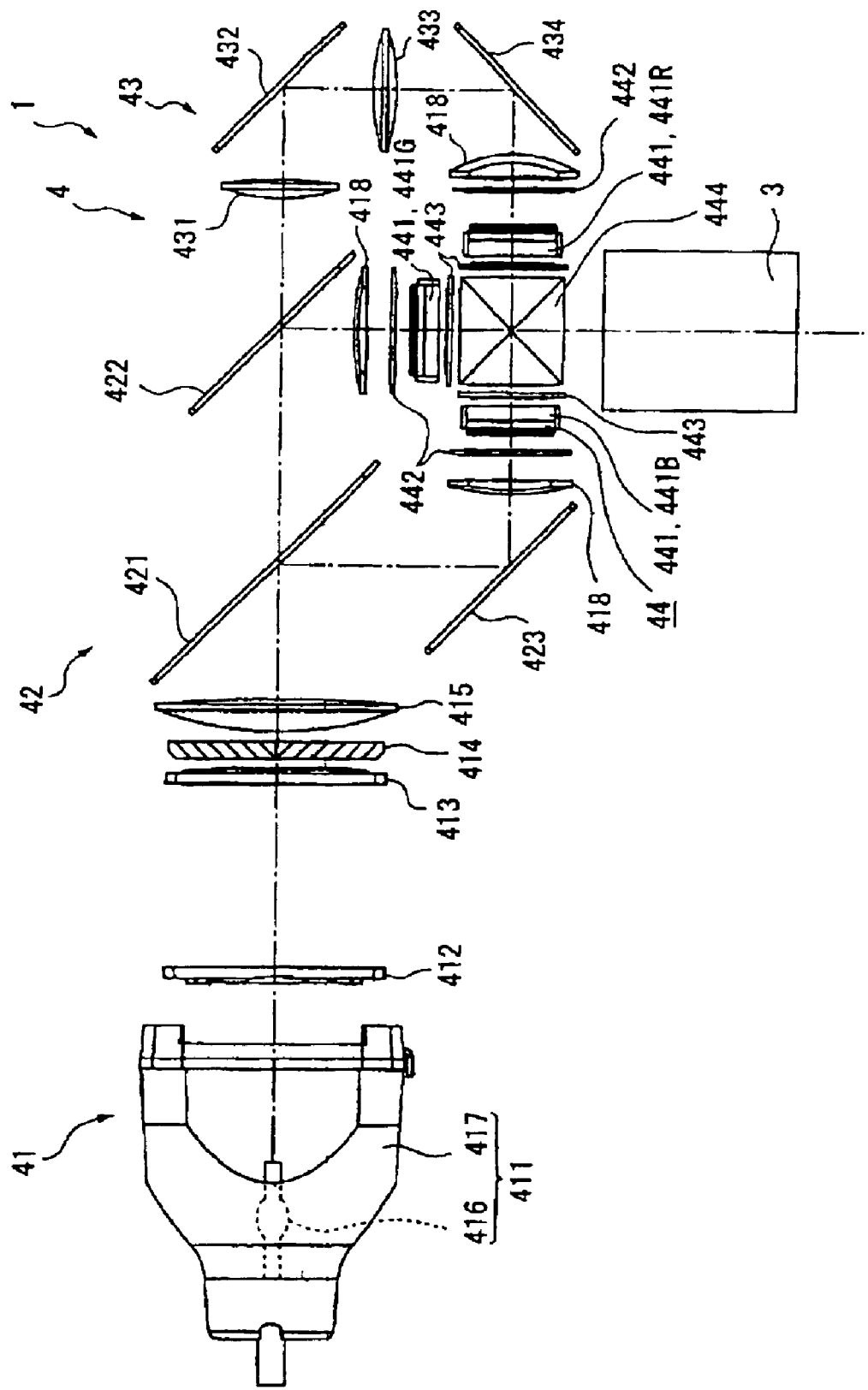
FIG. 5 is a schematic view of the structure of an optical system of the projector according to the embodiment.

As shown in FIGS. 3 to 5, the outer casing 2 accommodates the device body of the projector 1. The device body includes an optical unit 4, a control board 5, shown in FIG. 3, and a power supply device 6, shown in FIG. 4.

(2-1) Structure of the Optical Unit 4

The optical unit 4 serving as an optical system modulates light beams emitted from the light-source device 411 in accordance with image information to form an optical image and forms a projection image on a screen through the projector lens 3. The optical unit 4 includes the light-source device 411 and various optical components in an optical-component casing called a light guide 40, shown in FIG. 4.

The light guide 40 is constructed of a lower light guide 401 and an upper light guide (not shown in FIG. 4), which are made of a synthetic resin by injection molding.

The lower light guide 401 is shaped like an open-top container constructed of a bottom 401A and a side wall 401B for accommodating the optical components, the side wall 401B having multiple grooves 401C. The grooves 401C mount various optical components of the optical unit 4; thus, the optical components are arranged accurately on the illuminating-light axis set in the light guide 40. The upper light guide has a flat shape corresponding to the lower light guide 401 and is constructed as a lid for closing the top of the lower light guide 401.

The lower light guide 401 has a front wall having a circular opening at the light-beam emitting end of the bottom 401A, to which the base end of the projector lens 3 is secured.

The interior of the light guide 40 is roughly classified into a light integrator optical system 41, a color-separation optical system 42, a relay optical system 43, and an optical system 44 of a combination of a light intensity modulation system and a color-combination optical system in terms of functions. The optical unit 4 in this embodiment is employed in a 3-LCD projector projector and is constructed as a volume color separation type of optical unit for separating light beams emitted from the light integrator optical system 41 into three color light beams in the light guide 40.

The light integrator optical system 41 is an optical system for making light beams emitted from the light source to light beams with even illumination intensity in the plane perpendicular to an illuminating-light axis, and has the light-source device 411, a first lens array 412, a second lens array 413, a polarization conversion element 414, and a superimposed lens 415.

The light-source device 411 includes a light source lamp 416 serving as a radiation light source and a reflector 417. It reflects the radiating light beams emitted from the light source lamp 416 into substantially parallel light beams with the reflector 417 and lets it out. In this embodiment, a high-pressure mercury lamp is used as the light source lamp 416; however, a metal halide lamp or a halogen lamp may be used in addition to that. Although this embodiment uses a parabolic mirror as the reflector 417, it may employ a structure in which a collimating concave lens is arranged on the emerging plane of the reflector made of an ellipsoidal mirror.

The first lens array 412 has a structure in which small lenses having a substantially rectangular outline viewed along the illuminating light axis are arranged in matrix. Each small lens divides the light beams emitted from the light source lamp 416 into partial light beams and projects it along the illuminating light axis. The outline of each small lens is set to have a substantially similar figure to that of an image forming area of a later-described liquid crystal panel 441. For example, assuming that the aspect ratio (length-to-width ratio) of the image forming area of the liquid crystal panel 441 is 4 to 3, the aspect ratio of each small lens is also set at 4 to 3.

The second lens array 413 has substantially the same structure as that of the first lens array 412, in which small lenses are arranged in matrix. The second lens array 413 has the function of imaging the image of each small lens of the first lens array 412 on the liquid crystal panel 441, together with the superimposed lens 415.

The polarization conversion element 414 converts the light from the second lens array 413 to one kind of polarized light, thus increasing light-use efficiency in the optical device 44.

Specifically, each partial light beam converted to one type of polarized light by the polarization conversion element 414 is substantially superimposed finally on the liquid crystal panel 441 of the optical device 44. Since a projector that uses the liquid crystal panel 441 of the type of modulating polarized light can use only one kind of polarized light, it cannot use about half of the light beams from the light source lamp 416 that emits random polarized light. Therefore, it uses the polarization conversion element 414 to convert the entire light beam emitted from the light source lamp 416 to one kind of polarized light, thus increasing the light-use efficiency in the optical device 44. Such the polarization conversion element 414 is disclosed in JP-A-8-304739, for example.

The color-separation optical system 42 includes two dichroic mirrors 421 and 422 and a reflecting mirror 423, and has the function of separating multiple partial light beams emitted from the light integrator optical system 41 into three colors, red (R), green (G), and blue (B), of light through the dichroic mirrors 421 and 422.

The relay optical system 43 includes an incident-side lens 431, a relay lens 433, and reflecting mirrors 432 and 434, and has the function of guiding the red light separated in the color-separation optical system 42 to a liquid crystal panel 441R.

The dichroic mirror 421 of the color-separation optical system 42 transmits a red light component and a green light component and reflects a blue light component among the light beams emitted from the light integrator optical system 41. The blue light reflected by the dichroic mirror 421 is reflected by the reflecting mirror 423, passes through a field lens 418, and reaches a liquid crystal panel 441B for blue light. The field lens 418 converts the partial light beams emerging from the second lens array 413 to light beams parallel to the central axis (main light beam). The same is applied to the field lenses 418 arranged at the light incident side of the other liquid crystal panels 441G and 441R.

Of the red light and the green light that have passed through the dichroic mirror 421, the green light is reflected by the dichroic mirror 422, passes through the field lens 418, and reaches the green-light liquid crystal panel 441G. Meanwhile, the red light passes through the dichroic mirror 422, the relay optical system 43, and the field lens 418, and reaches the red-light liquid crystal panel 441R.

The reason that the relay optical system 43 is used for the red light is to prevent a decrease in light-use efficiency due to the light divergence and so on since the optical path of the red light is longer than that of the other color light beams. In other words, it is to transmit the partial light beams that are incidented on the incident-side lens 431 to the field lens 418 as they are. Although the relay optical system 43 allows the red light of the three colors of light to pass through, it is not limited to that and it may pass the blue light through, for example.

The optical system 44 forms a color image by modulating incident light beams in accordance with image information and includes three incident-end polarizing plates 442 on which the respective color light beams separated by the color-separation optical system 42 are incident, the liquid crystal panels 441R, 441G, and 441B arranged downstream from the respective incident-end polarizing plates 442 and serving as optical modulators, emerging-end polarizing plates 443 arranged downstream from the liquid crystal panels 441R, 441G, and 441B, and a cross dichroic prism 444 serving as a color-combination optical system.

The liquid crystal panels 441R, 441G, and 441B use, for example, a polysilicon thin-film transistor (TFT) as a switching element and each accommodate a sealed panel body containing liquid crystal in a pair of opposing transparent substrates in a retaining frame, which is not shown.

The color light beams separated by the color-separation optical system 42 in the optical system 44 are modulated by the liquid crystal panels 441R, 441G, and 441B, the incident-end polarizing plates 442, and the emerging-end polarizing plates 443 in accordance with image information to thereby form an optical image.

The incident-end polarizing plates 442 transmit only polarized light in a specific direction among the color light beams separated by the color-separation optical system 42 and absorb the other light beams. It has a polarizing film adhered on a substrate made of such as sapphire glass. The polarizing film may be adhered to the field lenses 418 without using the substrate.

The emerging-end polarizing plates 443 are also constructed in substantially the same way as the incident-end polarizing plates 442. They transmit only polarized light in a specific direction among the light beams emerging from the liquid crystal panels 441 (441R, 441G, and 441B) and absorb the other light beams. The polarizing film may be adhered to the cross dichroic prism 444 without using the substrate.

The incident-end polarizing plates 442 and the emerging-end polarizing plates 443 are set such that the respective polarizing light axes cross at right angles.

The cross dichroic prism 444 combines optical images emerging from the emerging-end polarizing plates 443 and modulated for each color light to form a color image.

The cross dichroic prism 444 has a dielectric multilayer film that reflects red light and a dielectric multilayer film that reflects blue light arranged in substantially X-shape along the interfaces of four rectangular prisms, with which three colors of light are combined.

The optical system 44 is integrated by bonding a panel-holding plate including pins projecting outward at the four corners of a rectangular plate to the light incident surfaces of the cross dichroic prism 444 and inserting the pins into holes in the respective retaining frames of the liquid crystal panels 441R, 441G, and 441B.

The integrated optical system 44 is arranged upstream of the optical path of the projector lens 3 of the light guide 40 and is fastened to the bottom of the lower light guide 401 with screws.

(2-2) Structure of the Control Board 5

The control board 5 is arranged to cover the top of the optical unit 4, as shown in FIG. 3, and includes a main board 51 implementing a processing unit and a liquid-crystal-panel driving IC and an interface board 52 joined at the rear end of the main board 51 and rising to the backs 21D and 22D of the outer casing 2.

On the back of the interface board 52, the aforesaid connector group 25 is mounted and image information inputted from the connector group 25 is outputted through the interface board 52 to the main board 51.

The processing unit on the main board 51 processes the inputted image information and then outputs a control instruction to the liquid-crystal-panel driving IC. The driving IC outputs a driving signal in accordance with the control instruction to drive the liquid crystal panel 441; thus, optical modulation is performed in accordance with the image information to form an optical image.

The main board 51 is covered with a sheet metal 53 which is formed by bending a punching metal. The sheet metal 53 is provided to prevent electromagnetic interference (EMI) due to circuit elements and the like on the main board 51.

(2-3) Structure of the Power Supply Device 6

Figure 6:
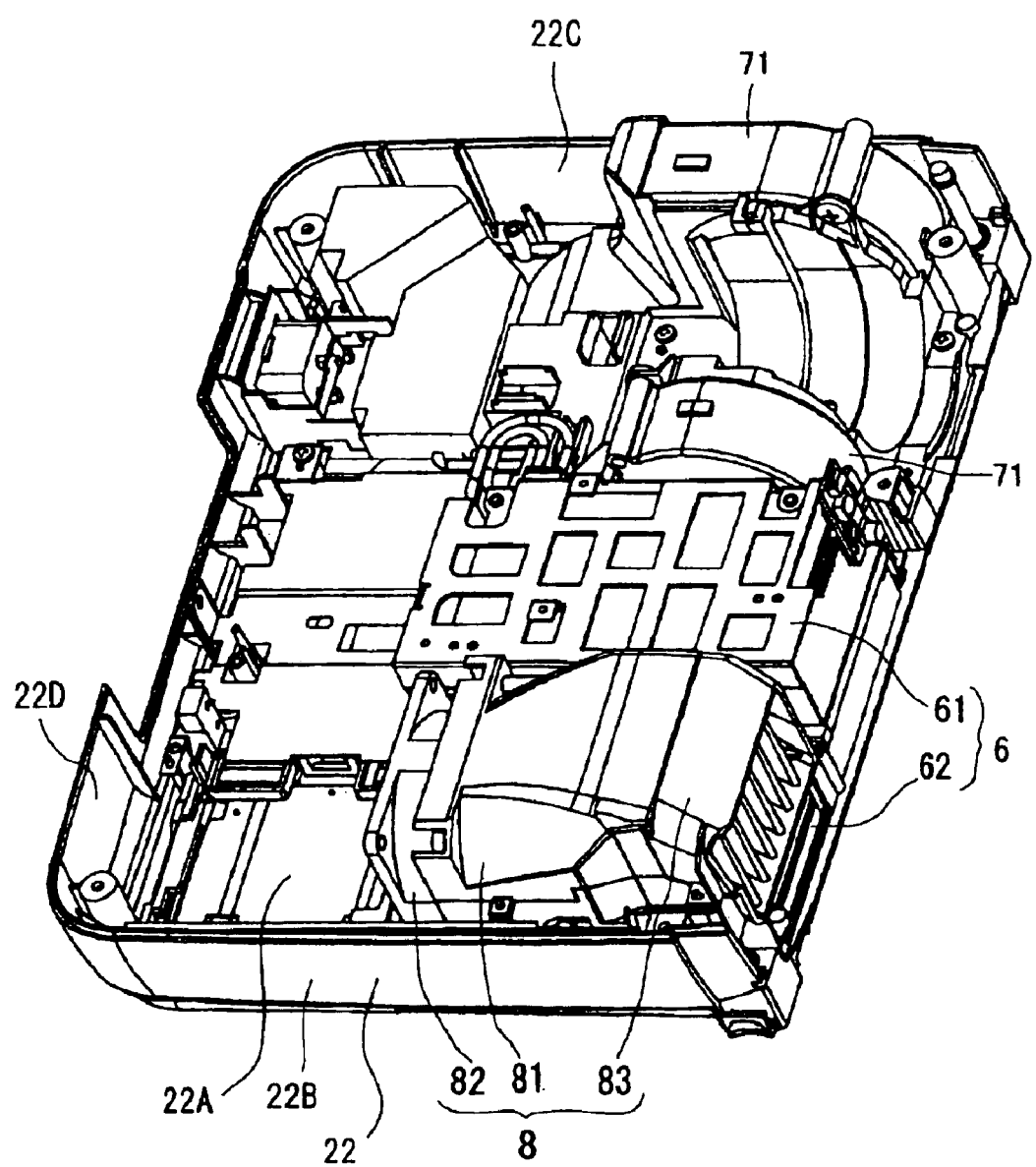
FIG. 6 is a schematic perspective view of the arrangement of a discharge unit and a power supply device according to the embodiment.
Figure 7:
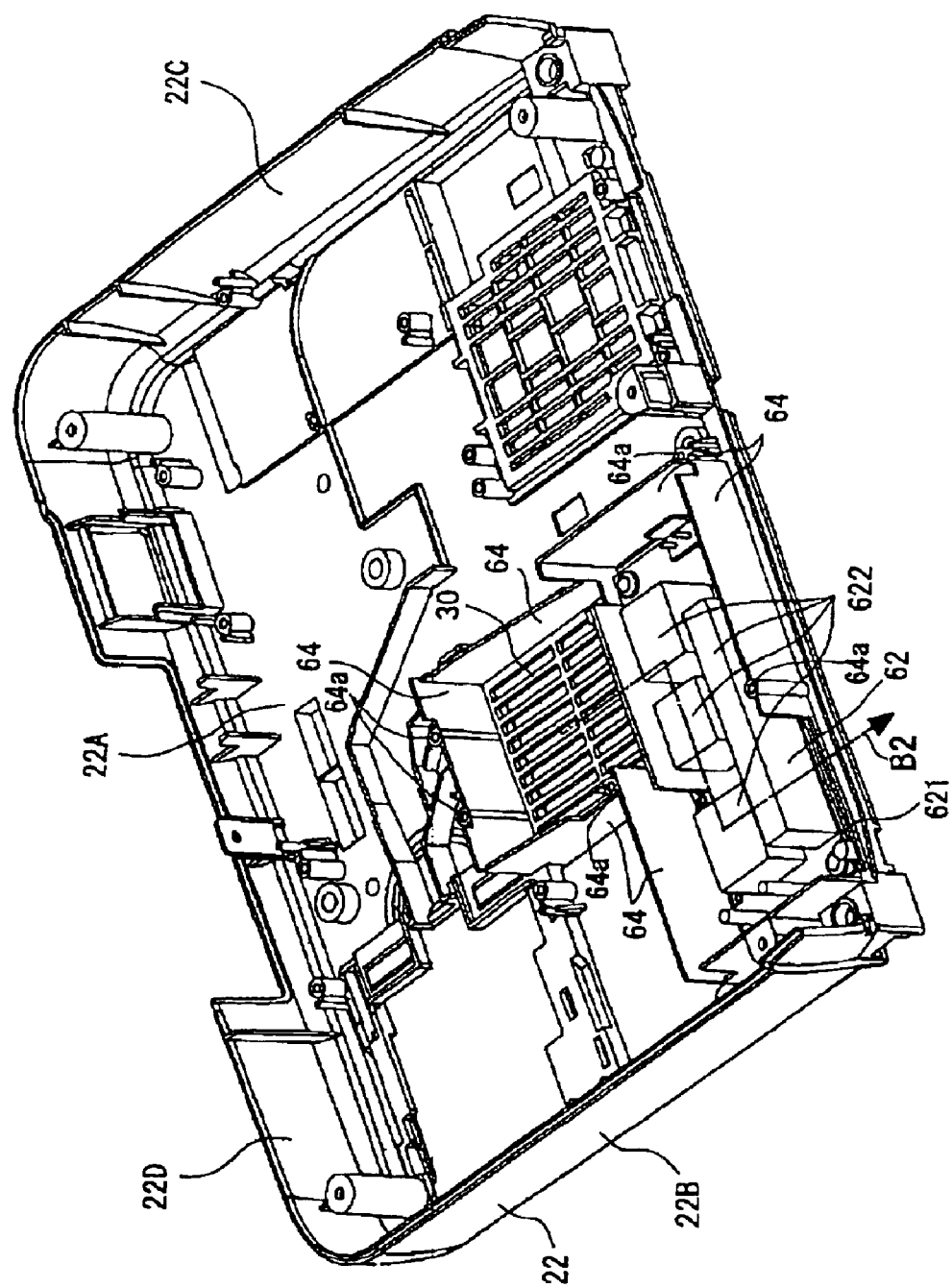
FIG. 7 is a schematic perspective view of the arrangement of the power supply device according to the embodiment.

The power supply device 6 includes a power unit 61 having a power circuit, shown in FIG. 6, and a lamp drive unit 62 having a light-source drive circuit, shown in FIG. 7, which is arranged below the power unit 61.

The power unit 61 supplies power that is supplied from the exterior through a power cable (not shown) connected to the inlet connector 33 to the lamp drive unit 62, the control board 5 and so on.

Figure 8:
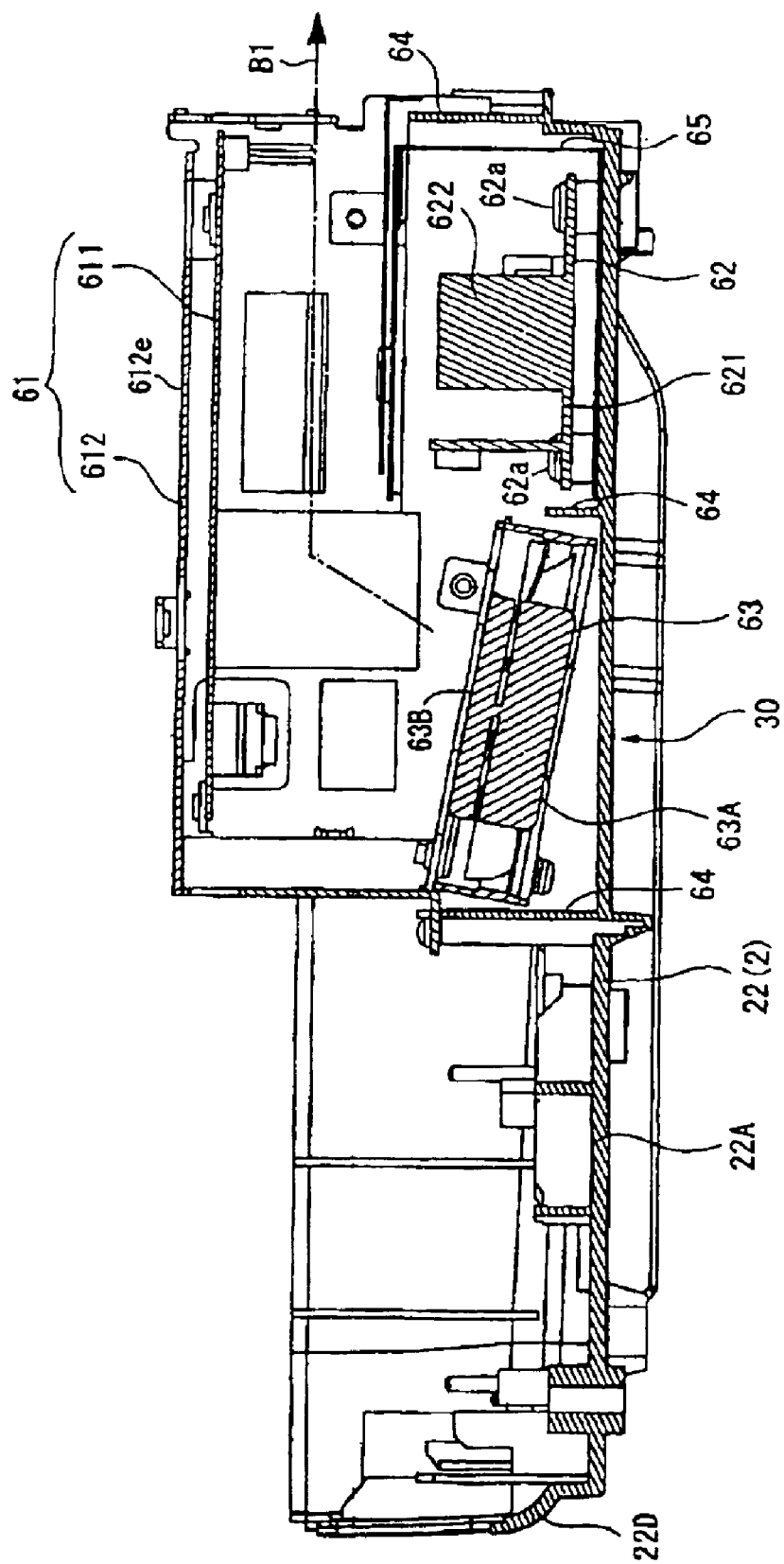
FIG. 8 is a sectional view of the alignment of the power supply device according to the embodiment.

As shown in FIG. 8, the power unit 61 includes a main-body board 611 and a metal tubular member 612 which surrounds the main-body board 611. The reason that the tubular member 612 is made of metal is to provide the function as a cooling air duct and to prevent EMI, as is the sheet metal 53 for the control board 5.

One side of the tubular member 612, extends downward, where an air intake fan 63 is attached.

The air intake fan 63 is inclined closer to the main-body board 611 and the top panel 612e of the tubular member 612 with distance from one end toward the other end. Part of a discharge surface 63B of the air intake fan 63 faces the interior of the tubular member 612.

The lamp drive unit 62 is a conversion circuit for supplying power to the light-source device 411 under stable voltage. A commercial alternating current inputted from the power unit 61 is rectified and converted to a direct current or an alternating rectangular wave current by the lamp drive unit 62 and is supplied to the light-source device 411.

As shown in FIG. 8, the lamp drive unit 62 includes a board 621, various circuit elements 622 on the top of the board 621, and a cooling air duct 65 for sending cooling air to the board 621 and the circuit elements 622. The lamp drive unit 62 is arranged such that part thereof intersects the power unit 61.

The power unit 61 and the lamp drive unit 62 are fixed to the lower case 22(2), as shown in FIG. 8.

The lamp drive unit 62 is first fixed to the bottom 22A of the lower case 22 with resin rivets 62a, while surrounded by the cooling air duct 65. The lamp drive unit 62 may be fixed to the bottom 22A not with the rivets 62a but with screws.

The power unit 61 is arranged above the lamp drive unit 62 so as to intersect part of the lamp drive unit 62, in plan view, and is fixed to the top of a plate 64 with screws 64b, with screw holes on the top of the plate 64 and screw holes of the tubular member 612 of the power unit 61 aligned to each other (not shown in FIG. 8).

In this case, the air intake fan 63 in the tubular member 612 is arranged slightly apart from an opening 30 formed in the bottom 22A while surrounded by the multiple plates 64, such that an air-intake surface 63A of the air intake fan 63 is inclined relative to the bottom 22A so as to come close to the bottom 22A with increasing proximity to the direction of projection of the projector 1.

This embodiment has such inclination arrangement because it is the front of the projector 1 that discharges the air after cooling in a later-described cooling system A. However, it is preferable to reverse the inclination when discharging the air on the back of the projector 1. In other words, the air intake fan 63 is preferably inclined such that the air-intake surface 63A comes close to the inlet opening 33 with increasing proximity to the direction of discharge of the cooling air flow of the projector 1, that is, to the opening 35.

Such an arrangement reduces the possibility that the air intake fan 63 takes in the air in the projector 1 that has cooled other heat sources to get warm, so that the air intake fan 63 can take in low-temperature air to further increase cooling efficiency.

(2-4) Cooling Structure

Figure 9:
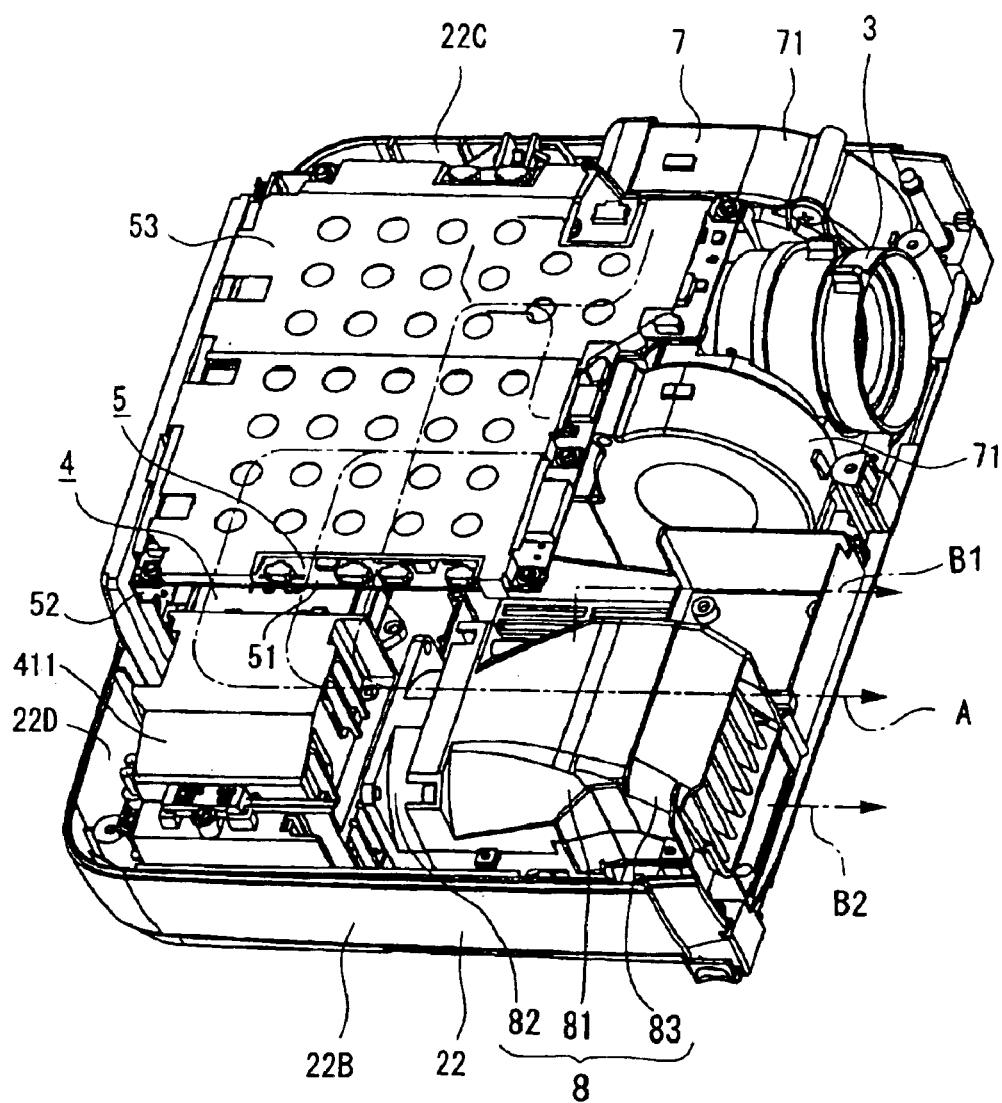
FIG. 9 is a schematic perspective view of a cooling system of the projector according to the embodiment.

As shown in FIG. 9, the aforesaid projector 1 includes a cooling system A for cooling the optical system 44 and a cooling system B for cooling the power supply device 6.

The cooling system A is the flow of cooling air taken from the opening 29 (refer to FIG. 2) by an air intake unit 7.

The air intake unit 7 includes a pair of sirocco fans 71 opposed with the projector lens 3 therebetween and a duct (not shown) for communicating the air intake surfaces of the pair of sirocco fans 71 with the opening 29.

The cooling air directly taken from the exterior of the projector 1 by the air intake unit 7 is fed below the liquid crystal panels 441R, 441G, and 441B and flows from below to upward along the light-beam incident surface of the cross dichroic prism 444 to cool the liquid crystal panels 441R, 441G, and 441B, the emerging-end polarizing plates 443, and the incident-end polarizing plates 442.

The cooling air flowing above the optical system 44 impinges on the main board 51 of the control board 5 and so the flow is changed perpendicularly to cool various circuit elements mounted on the main board 51.

The cooling air that has cooled the main board 51 is collected and fed to a discharge duct 82 with a discharge fan 81 and is then discharged from the opening 35 (refer to FIG. 1) of the front case 23 to the exterior of the projector 1.

The sirocco fan 71 arranged on the left of the projector lens 3, viewed from the front of the projector 1 in FIG. 9, feeds the cooling air to the liquid crystal panels 441R and 441B, part of which is used as cooling air for the polarization conversion element 414 and the light-source device 411.

Specifically, part of the cooling air flows in the clearance between the bottom 22A of the lower case 22 and the lower surface of the lower light guide 401 and bifurcates in midstream. One of the bifurcated cooling air is fed into the light guide 40 through a slit formed in the lower surface of the lower light guide 401 at the position corresponding to the polarization conversion element 414 and is then fed to the light-source device 411 to cool the light source lamp 416. The other bifurcated cooling air is directly fed to the light-source device 411 to cool the light source lamp 416.

The cooling air that has cooled the light-source device 411 is collected and sent to the discharge duct 82 with the discharge fan 81 and is then discharged from the opening 35 (refer to FIG. 1) of the front case 23 to the exterior of the projector 1.

The structure of a discharge unit 8 including the discharge fan 81 and the discharge duct 82 will be described later.

The cooling system B is the flow of the cooling air taken from the opening 30 (refer to FIG. 2) with the air intake fan 63 of the power unit 61 and includes a cooling system B1 for cooling the power unit 61 and a cooling system B2 for cooling the lamp drive unit 62.

More detailed description will be given with reference to FIG. 8. The cooling system B1 is a partial air flow directly taken from the exterior of the projector 1 through the opening 30 with the air intake fan 63, which is fed into the tubular member 612 of the power unit 61 to cool the circuit elements mounted on the main-body board 611, and which is then discharged directly from the opening 35 (refer to FIG. 1) formed in the front case 23.

In the cooling system B2, the other partial cooling air directly taken from the exterior of the projector 1 through the opening 30 with the air intake fan 63 flows along the plate 64 in the lower part of the tubular member 612 and is fed into the cooling air duct 65 of the lamp drive unit 62 to cool the circuit elements on the board 621 of the lamp drive unit 62, and thereafter it is discharged to the exterior from the lower part of the discharge duct 81 of the opening 35.

As described above, the cooling system A and the cooling system B directly take outside air with the air intake fans 71 and 63 to cool the heat sources, respectively, and discharge the air from the discharge duct 82 of the cooling system A from the left upper part of the opening 35, the air from the cooling air duct 65 of the cooling system B2 from the left lower part of the opening 35, and the air from the tubular member 612 of the cooling system B1 from the right lower part of the opening 35, seen from the front case 23 of the projector 1. Therefore, although the air after cooling is discharged from the opening 35 in both of the cooling system A and the cooling system B, it is discharged from different regions of the opening 35.

(2-5) Structure of Discharge Unit

As shown in FIG. 9, the discharge unit 8 is arranged along the outer casing 2 on the side of the light-source device 411.

The discharge unit 8 includes the cylindrical discharge duct 81, the axial fan 82 attached to the end of the discharge duct 81 adjacent to the light-source device 411, which serves as a discharge fan, and an internal louver 83 attached to the end of the discharge duct 81 adjacent to the front case 23. The discharge unit 8 discharges the air that has cooled the vicinity of the light-source device 411 and the control board 5 in the projector 1 through the discharge duct 81 and the internal louver 83 by the air flow with the axial fan 82.

Figure 10:
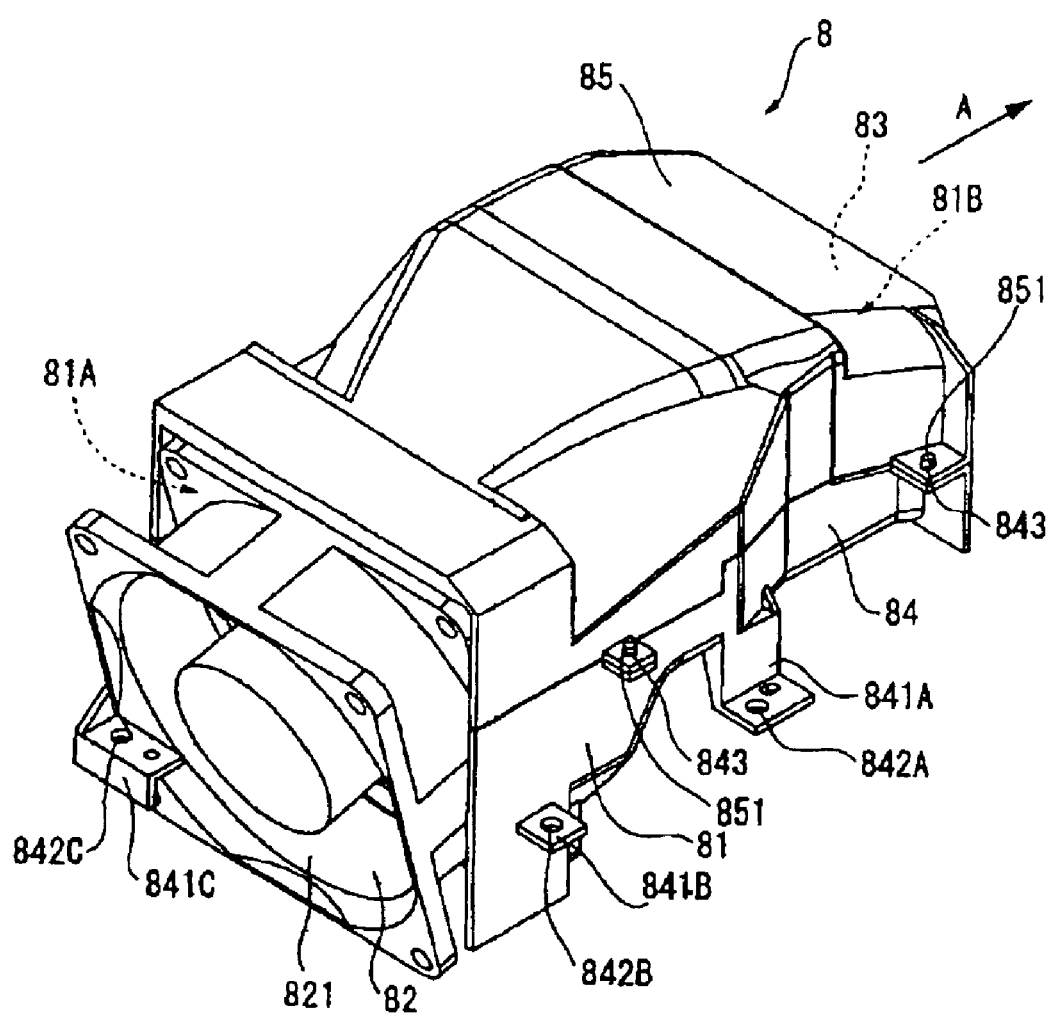
FIG. 10 is a perspective view of the arrangement of the discharge unit according to the embodiment.
Figure 11:
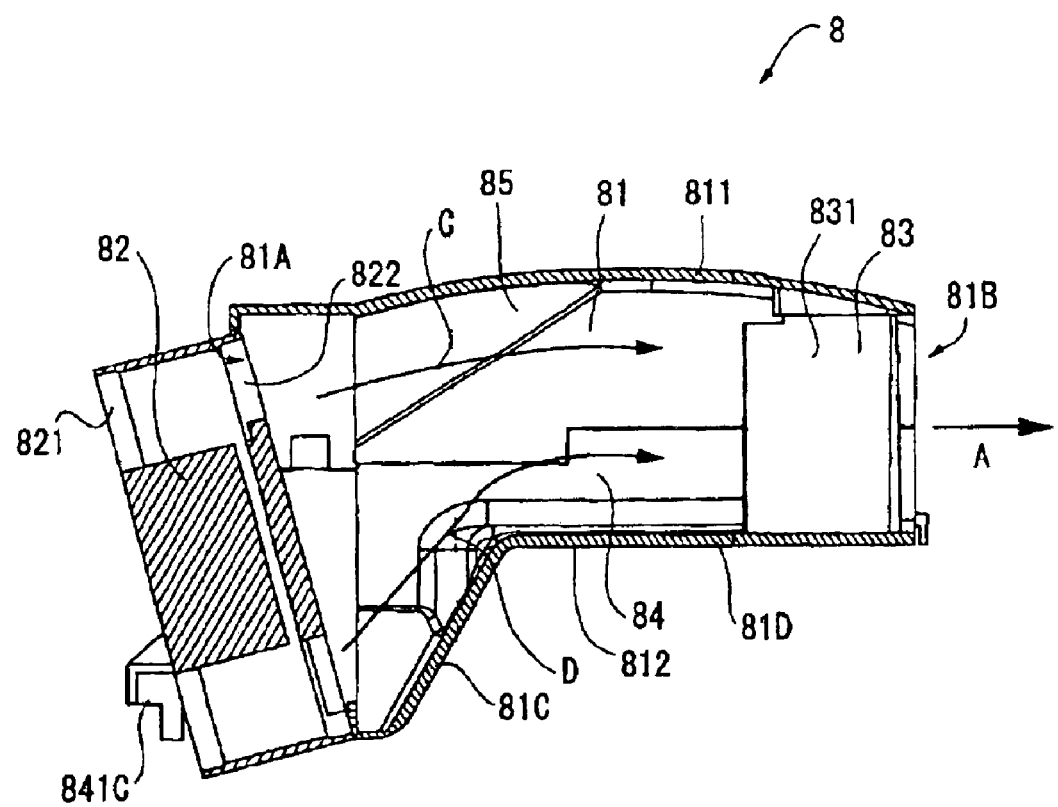
FIG. 11 is a sectional side view of the arrangement of the discharge unit according to the embodiment.
Figure 12:
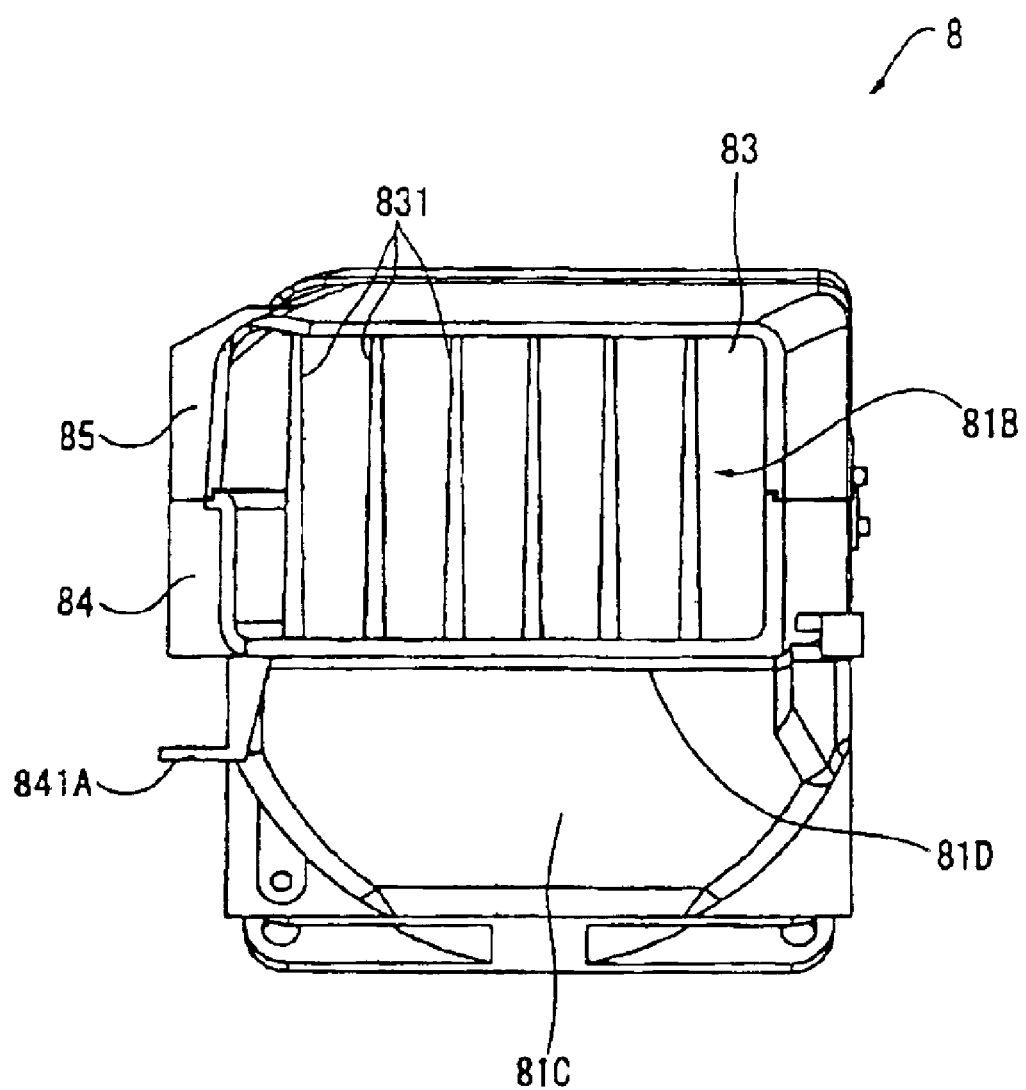
FIG. 12 is a front view of the arrangement of the discharge unit according to the embodiment.

As shown in FIGS. 10 to 12, the discharge duct 81 is a rectangular cross-section pipe, whose opposite end openings serve as an air intake port 81A and a discharge port 81B.

As shown in FIGS. 11 and 12, the opening area of the discharge port 81B of the discharge duct 81 is about half of that of the air intake port 81A, viewed from the cooling-air discharge direction (the direction of the flow of the cooling system A) and the discharge port 81B is eccentric with respect to the air intake port 81A. As shown in FIG. 11, the discharge port 81B is arranged eccentrically upward in the drawing with respect to the air intake port 81A. Specifically, as shown in FIG. 12, when the discharge unit 8 is viewed from the discharge port 81B, the discharge port 81B overlaps with the upper half of the air intake port 81A and has the same size as that.

The discharge duct 81 has an upper eccentric-side wall 811 on the side (upper side in FIG. 11) where the discharge port 81B is eccentric with respect to the air intake port 81A. The eccentric-side wall 811 bulges outward (upward in FIG. 11) from the discharge duct 81. The discharge duct 81 also has a lower opposite eccentric-side wall 812 on the side (the lower side in FIG. 11) opposite to the side where the discharge port 81B is eccentric with respect to the air intake port 81A. The opposite eccentric-side wall 812 is recessed inwardly from the discharge duct 81 (upward in FIG. 11) and includes a lower slope 81C that is inclined closer to the eccentric-side wall 811 with distance from the air intake port 81A toward the discharge port 81B, from the air intake port 81A through the center, and a lower horizontal part 81D from the center to the discharge port 81B. Thus, the discharge duct 81 is a pipe that is wide based toward the end near the air intake port 81A and has substantially the same inside diameter at each part near the discharge port 81B. The eccentric-side wall 811 may not bulge outward but may be flat, or horizontal, in which case the lower horizontal part 81D is substantially parallel to the eccentric-side wall 811.

The discharge duct 81 is provided with the internal louver 83 near the discharge port 81B.

The internal louver 83 is a rectifier louver for rectifying the cooling air discharged from the discharge port 81B and letting it flow only in a specified direction, and includes vertical multiple blades 831 arranged substantially in parallel to one another.

The blades 831 are arranged horizontally in parallel along the channel of the cooling air and partition the discharge port 81B vertically. The blades 831 is arranged diagonally downward relative to the discharge port 81B when viewed from the direction of the flow of the air (cooling system A) in the discharge duct 81 to allow the cooling air discharged from the discharge port 81B to flow in the direction out of the image projecting region.

The discharge duct 81 is made of a synthetic resin by injection molding and is composed of a pair of duct members 84 and 85 which is divided along the length of the tubular member and which can be combined to each other. The pair of duct members 84 and 85 is the substantially U-shaped lower duct member 84 constituting the lower part of the discharge duct 81, of which the upper part of the discharge duct 81 is opened, and the upper duct member 85 having a substantially U-shape in cross section, which is arranged above the lower duct member 84, of which the lower part is opened.

As shown in FIGS. 10 and 12, the lower duct member 84 includes retaining parts 841A to 841C for retaining the discharge unit 8 to the bottom plate of the outer casing 2. The retaining part 841A extends downward from the lower surface of the lower duct member 84 in the middle of the discharge direction, the lower end extending horizontally, in which a hole 842A is formed. The retaining parts 841B extend from opposite sides at the end of the lower duct member 84 adjacent to the air intake port 81A, each having a hole 842B. The retaining part 841C extends from the end of the lower duct member 84 adjacent to the air intake port 81A toward the air intake end of the axial fan 82, and has a hole 842C at the end.

The four corners at the side upper rim of the lower duct member 84 extend horizontally, each having an upward pin 843.

Meanwhile, at the side lower rim of the upper duct member 85, extensions each having a hole 851 at the position corresponding to the pin 843 of the lower duct member 84 are provided.

The discharge duct 81 is formed by inserting the four pins 843 of the lower duct member 84 through the four holes 851 of the upper duct member 85 to combine the lower duct member 84 and the upper duct member 85 and fusing the ends of the pins 843 with an iron (not shown).

The axial fan 82 includes an air intake surface 821 and a discharge surface 822. The axial fan 82 aspirates the air that has cooled the interior of the projector 1 including the light source lamp 416 through the air intake surface 821 and sends the aspirated cooling air from the discharge surface 822 into the discharge duct 81.

Since the axial fan 82 is fixed to the air intake port 81A of the discharge duct 81 with screws, the direction of air flow is inclined upward with respect to the flowing direction of the cooling system A and the discharge surface 822 is brought into close contact with the air intake port 81A to prevent the leakage of the cooling air through the joined part. The inclination of the axial fan 82 will be specifically described. The discharge surface 822 of the axial fan 82 is inclined to be apart from the eccentric-side wall 811 with distance from the air intake port 81A toward the discharge port 81B. In other words, when the discharge surface 822 of the axial fan 82 is arranged almost perpendicularly to the eccentric-side wall 811 so as to be substantially in agreement with the flowing direction A of the cooling system A (refer to FIG. 11), the cooling air passing by the eccentric-side wall 811 travels substantially in parallel with the eccentric-side wall 811 toward the discharge port 81B in the discharge duct 81, while on the opposite eccentric-side wall 812, the air from the axial fan 82 strikes against the slope 81C in the direction in which the angle formed with the perpendicular from the slope 81C is small, so that the air does not flow well. However, as described above, when the discharge surface 822 of the axial fan 82 is inclined, or the direction of air flow of the axial fan 82 is inclined with respect to the direction of the flow of the cooling system A, a cooling air D (refer to FIG. 11) passing by the opposite eccentric-side wall 812 strikes against the slope 81C in the direction in which the angle formed with the perpendicular from the slope 81C is larger, so that the air flows smoothly toward the discharge port 81B.

With the axial fan 82, as shown in FIG. 11, a cooling air C passing by the eccentric-side wall 811 at the eccentric end of the discharge port 81B, or the upper surface of the discharge duct 81, is gently shifted toward the discharge port 81B by the bulging eccentric-side wall 811 of the discharge duct 81 and is discharged from the discharge port 81B.

On the other hand, a cooling air D passing by the opposite eccentric-side wall 812 that is the lower surface of the discharge duct 81 strikes against the lower slope 81C to move upward, travels along the lower horizontal part 81D, and is discharged from the discharge port 81B.

The discharge unit 8 is fastened to the lower case 22 with screws. Specifically, the discharge unit 8 is arranged on the lamp drive unit 62 so as to overlap with part of the lamp drive unit 62 in plan view and is fixed to the bottom 22A of the lower case 22, with the retaining parts 841A to 841C aligned (refer to FIGS. 7 and 9).

Accordingly, the air intake port 81A of the discharge unit 8 faces the side of the light source lamp 416 of the light-source device 411, while the discharge port 81B is joined to the opening 35 of the front case 23.

In this embodiment, although the air intake port 81A is arranged to cover the side, which is parallel to the light-emitting direction, of the light-source device 411, it is not limited to that and the air intake port 81A can be arranged appropriately with respect to the light-source device 411 so as not to prevent the light emitted from the light-source device 411. For example, the air intake port may be arranged to cover any surfaces parallel to the light-emitting direction of the light-source device 411 and the surface opposite to the light-emitting direction of the light-source device 411.

(3) Advantages of the Embodiment

The above-described embodiment offers the following advantages.

(3-1) Since the opening area of the discharge port 81B is made smaller than that of the air intake port 81A, the part of the light source lamp 416 which can be viewed from the flowing direction of the cooling system A, or from the opening 35 of the front case 23, can be reduced, thus improving light blocking effect and increasing the discharge pressure of the cooling air. Since the discharge port 81B is arranged eccentrically to the air intake port, the center of the light source having high luminance can be avoided even if light leaks to the exterior.

(3-2) Since the axial fan 82 is attached to the air intake port 81A, there is no need to miniaturize the discharge fan as in the case where it is attached to the discharge port, thus ensuring sufficient discharge performance.

(3-3) Since the flow of the cooling air C passing by the upper surface of the discharge duct 81 and the cooling air D that passing by the lower surface of the discharge duct 81 can be well balanced by inclining the direction of air flow from the axial fan 82 upward with respect to the discharge direction of the cooling air, the discharge performance can be improved.

(3-4) Since the opening area of the discharge port 81B is about half of that of the air intake port 81A, the light-blocking effect by the discharge port can be maximized while ensuring the size of the discharge port sufficient to discharge the cooling air.

(3-5) Since the eccentric-side wall 811 of the discharge duct 81 where the discharge port 81B is off-centered bulges outward, the angle at which the cooling air C strikes against the eccentric-side wall 811 that is the upper surface of the discharge duct 81 can be decreased to gently shift the flow to the discharge port 81B, reducing frictional resistance by the eccentric-side wall 811 of the discharge duct 81, and thus allowing the cooling air to be discharged more smoothly.

(3-6) Since the discharge duct 81 increases in inside diameter with distance from the center toward the air intake port 81A and has a substantially equal inside diameter from the center toward the discharge port 81B, the air taken from the larger air intake port 81A can be concentrated and rectified near the discharge port 81B and can be discharged, thus achieving the discharge unit 8 with high discharge efficiency. Providing the internal louver 83 at the discharge port 81B allows the direction of discharge to be controlled.

(3-7) The use of the discharge unit 8 according to the invention for the projector 1 allows efficient cooling of the light source lamp 416 by taking in the cooling air through the side of the light-source device 411 of the projector 1 and blocking the light leaking from the light source lamp 416, thus improving the quality as the projector. Since the internal louver 83 is provided at the discharge port 81B, the cooling is discharged in the direction off the image projecting region of the projector 1, which allows preferable image projection.

(4) Modifications of the Embodiment

The invention is not limited to the above-described embodiment and includes the following modifications.

In the embodiment, although the lower surface of the discharge duct 81 includes the lower slope 81C and the lower horizontal part 81D, the invention is not limited to that; the lower surface of the discharge duct may be gently recessed.

In the embodiment, although the opening area of the discharge port 81B is about half of that of the air intake port 81A and the center thereof is deviated upward, the invention is not limited to that: the opening area and the direction of eccentricity of the discharge port 81B may be set as appropriate.

Although the embodiment use two lens arrays 120 and 130 for dividing the light from the light source 110 into a plurality of partial light beams, the invention may be applied to projectors without such lens arrays.

While the embodiment has been described with reference to a projector using a liquid crystal panel as an optical modulator, the invention may be applied to a projector that uses other modulators other than the liquid crystal panel, such as a modulator in which pixels are configured of micromirrors.

The embodiment has been described with an example of a projector including three optical modulators; however, the invention can also be applied to projectors including one, two, or more than four projectors.

The embodiment has been described with an example in which the invention is applied to a transmission projector; however, the invention can also be applied to a reflection projector, where the "transmission" means that the light valve of a liquid crystal panel is of light transmission type and the "reflection" means that the light valve is of a light reflection type. In the case of the reflection projector, the light valve can be constructed of only a liquid crystal panel and a pair of polarizing plates is not necessary. In the reflection projector, the cross dichroic prism is used as a color-light separating means for separating illumination light into three colors of light, red, green, and blue, and sometimes it is also used as a color-light combining means for again combining the modulated three colors of light and emitting in the same direction. A dichroic prism of a combination of triangle or quadratic dichroic prisms may be used in place of the cross dichroic prism. Application of the invention to the reflection projector also offers substantially the same advantages as those of the transmission projector. The light valve is not limited to the liquid crystal panel but may be a light valve using a micromirror, for example.

The projector includes a front projector for projecting an image from the direction to observe a projection surface and a back projector for projecting an image from the side opposite to the direction to observe the projecting surface, to both of which the embodiment can be applied.

What is claimed is:

1. An electronic device, comprising:

a casing;

a light source mounted in the casing;

a discharge duct in the casing and including an air intake port facing the light source and a discharge port to discharge cooling air that is taken from the air intake port and that has cooled the light source; and a discharge fan mounted between the air intake port and the light source in the casing, the discharge port having an opening area smaller than that of the air intake port, a center of the discharge port being eccentric to a center of the air intake port, and a direction of air flow from the discharge fan being inclined with respect to a direction of the discharge of the cooling air from the discharge port, the discharge duct having an eccentric-side wall on the side where the center of the discharge port is eccentric to the center of the air intake port, the eccentric-side wall bulges toward the side where the discharge port is eccentric to the air intake port, and the discharge surface of the discharge fan being inclined away from the eccentric-side wall at a distance from the air intake port toward the discharge port.

2. The electronic device according to claim 1, further comprising:

the discharge duct having an opposite eccentric-side wall on the side opposite to the side where the center of the discharge port is eccentric to the center of the air intake port, the opposite eccentric-side wall having a slope inclined closer to the eccentric-side wall at a distance from the air intake port toward the discharge port, and the slope being provided to a duct intake side of the opposite eccentric-side wall.

3. The electronic device according to claim 2, the opposite eccentric-side wall having a wall substantially parallel to the eccentric-side wall on a discharge port side.

4. The electronic device according to claim 1, the opening area of the discharge port being substantially half of that of the air intake port.

5. The electronic device according to claim 1, further comprising a louver including a plurality of blades, the louver being mounted to the discharge port.

6. The electronic device according to claim 1, the electronic device being a projector including an optical system that modulates light beams emitted from the light source in accordance with image information, forms an optical image and projects it on an enlarged scale.

7. The electronic device according to claim 6, further comprising:

the discharge duct having an opposite eccentric-side wall on the side opposite to the side where the center of the discharge port is eccentric to the center of the air intake port, the opposite eccentric-side wall having a slope inclined closer to the eccentric-side wall at a distance from the air intake port toward the discharge port, and the slope being provided to a duct intake side of the opposite eccentric-side wall.

8. The electronic device according to claim 7, the opposite eccentric-side wall having a wall substantially parallel to the eccentric-side wall on a discharge port side.

9. The electronic device according to claim 6, the opening area of the discharge port being substantially half of that of the air intake port.

10. The electronic device according to claim 6, further comprising:

a louver including a plurality of blades, the louver being mounted to the discharge port.

11. An electronic device, comprising:

a casing;

a light source mounted in the casing;

a discharge duct in the casing and including an air intake port facing the light source and a discharge port to discharge cooling air that is taken from the air intake port and that has cooled the light source; and a discharge fan mounted between the air intake port and the light source in the casing, the discharge port having an opening area smaller than that of the air intake port, a center of the discharge port being eccentric to a center of the air intake port, the discharge duct having an opposite eccentric-side wall on a side opposite to a side where the center of the discharge port is eccentric to the center of the air intake port;

the opposite eccentric-side wall having a substantially horizontal portion, the substantially horizontal portion located at an end of the discharge duct closer to the discharge port with the cooling air being discharged along the horizontal portion, the discharge fan mounted so that a direction of air flow from the discharge fan is inclined with respect to a direction of the discharge of the cooling air, the discharge duct having an eccentric-side wall on the side where the center of the discharge port is eccentric to the center of the air intake port, the eccentric-side wall bulges toward the side where the discharge port is eccentric to the air intake port, and the discharge surface of the discharge fan being inclined away from the eccentric-side wall at a distance from the air intake port toward the discharge port.

12. The electronic device according to claim 11, further comprising:

the discharge duct having an eccentric-side wall on a side where the center of the discharge port is eccentric to the center of the air intake port, the eccentric-side wall being substantially horizontal, and a discharge surface of the discharge fan being inclined away from the eccentric-side wall at a distance from the air intake port toward the discharge port.

13. The electronic device according to claim 11, further comprising:

the opposite eccentric-side wall having a slope inclined closer to the eccentric-side wall at a distance from the air intake port toward the discharge port, and the slope being provided to a duct intake side of the opposite eccentric-side wall.

14. The electronic device according to claim 11, the opening area of the discharge port being substantially half of that of the air intake port.

15. The electronic device according to claim 11, further comprising a louver including a plurality of blades, the louver being mounted to the discharge port.

16. The electronic device according to claim 11, the electronic device being a projector including an optical system that modulates light beams emitted from the light source in accordance with image information, forms an optical image and projects it on an enlarged scale.

17. The electronic device according to claim 16, further comprising:

the discharge duct having an eccentric-side wall on a side where the center of the discharge port is eccentric to the center of the air intake port, the eccentric-side wall being substantially horizontal, and a discharge surface of the discharge fan being inclined away from the eccentric-side wall at a distance from the air intake port toward the discharge port.

18. The electronic device according to claim 16, further comprising:

the opposite eccentric-side wall having a slope inclined closer to the eccentric-side wall at a distance from the air intake port toward the discharge port, and the slope being provided to a duct intake side of the opposite eccentric-side wall.

19. The electronic device according to claim 16, the opening area of the discharge port being substantially half of that of the air intake port.

20. The electronic device according to claim 16, further comprising a louver including a plurality of blades, the louver being mounted to the discharge port.

* * * * *